United States Patent
Parekh et al.

(10) Patent No.: US 12,198,113 B2
(45) Date of Patent: Jan. 14, 2025

(54) DIGITAL CURRENCY AGGREGATION PROCESSING

(71) Applicant: Visa International Service Association, San Francisco, CA (US)

(72) Inventors: Raj Parekh, San Francisco, CA (US); Libby Kurien, San Francisco, CA (US); Cuy Sheffield, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 35 days.

(21) Appl. No.: 17/909,327

(22) PCT Filed: Jun. 24, 2021

(86) PCT No.: PCT/US2021/038966
§ 371 (c)(1),
(2) Date: Sep. 2, 2022

(87) PCT Pub. No.: WO2021/263032
PCT Pub. Date: Dec. 30, 2021

(65) Prior Publication Data
US 2023/0109085 A1   Apr. 6, 2023

Related U.S. Application Data

(60) Provisional application No. 63/044,828, filed on Jun. 26, 2020.

(51) Int. Cl.
*G06Q 40/00* (2023.01)
*G06Q 20/06* (2012.01)
(Continued)

(52) U.S. Cl.
CPC ......... *G06Q 20/108* (2013.01); *G06Q 20/065* (2013.01); *G06Q 20/389* (2013.01); *G06Q 20/40* (2013.01)

(58) Field of Classification Search
CPC .... G06Q 40/00; G06Q 20/108; G06Q 20/065; G06Q 20/389; G06Q 20/40
See application file for complete search history.

(56) References Cited

U.S. PATENT DOCUMENTS

2014/0330721 A1   11/2014   Wang
2017/0103394 A1*   4/2017   Colhoun ............ G06Q 20/3672
(Continued)

FOREIGN PATENT DOCUMENTS

CN   109345222 A   *   2/2019   ............. G06Q 20/10
WO   2016105265 A1   6/2016

OTHER PUBLICATIONS

Distributed ledger technology in payments, clearing, and settlement DC Mills, K Wang, B Malone, A Ravi, J Marquardt . . . —2016— papers.ssrn.com (Year: 2016).*
(Continued)

*Primary Examiner* — Lalita M Hamilton
(74) *Attorney, Agent, or Firm* — Kilpatrick Townsend & Stockton LLP

(57) ABSTRACT

A method is disclosed. The method comprises receiving, by a processing network computer, a plurality of clearing files from a plurality of transport computers. The processing network computer may then generate, based on the data in the plurality of clearing files, a settlement file comprising a first settlement amount and a first destination associated with an account at a custodian computer. The processing network computer may then transmit the settlement file to an authorizing entity computer. The processing network computer may then transmit a transfer instruction file comprising the first destination, a second settlement amount, and a second destination associated with a transport computer to a custodian computer. Later, the authorizing entity computer sends the first settlement amount to the first destination at the custodian computer. Then the custodian computer, or the (Continued)

processing network computer, sends the second settlement amount to the second destination associated with the transport computer.

20 Claims, 10 Drawing Sheets

(51) Int. Cl.
*G06Q 20/10* (2012.01)
*G06Q 20/38* (2012.01)
*G06Q 20/40* (2012.01)

(56) References Cited

U.S. PATENT DOCUMENTS

| | | |
|---|---|---|
| 2018/0268382 A1 | 9/2018 | Wasserman |
| 2019/0220856 A1 | 7/2019 | Li et al. |
| 2020/0082365 A1 | 3/2020 | Brock et al. |
| 2020/0272619 A1* | 8/2020 | Alferov ................ H04L 9/3297 |
| 2021/0073913 A1* | 3/2021 | Ingargiola ............. H04L 67/104 |
| 2021/0151202 A1* | 5/2021 | Jabbar .................... G16Y 40/10 |
| 2022/0122062 A1* | 4/2022 | Mayblum ............ G06Q 20/381 |

OTHER PUBLICATIONS

Application No. PCT/US2021/038966, International Search Report and Written Opinion, Mailed on Oct. 13, 2021, 9 pages.

\* cited by examiner

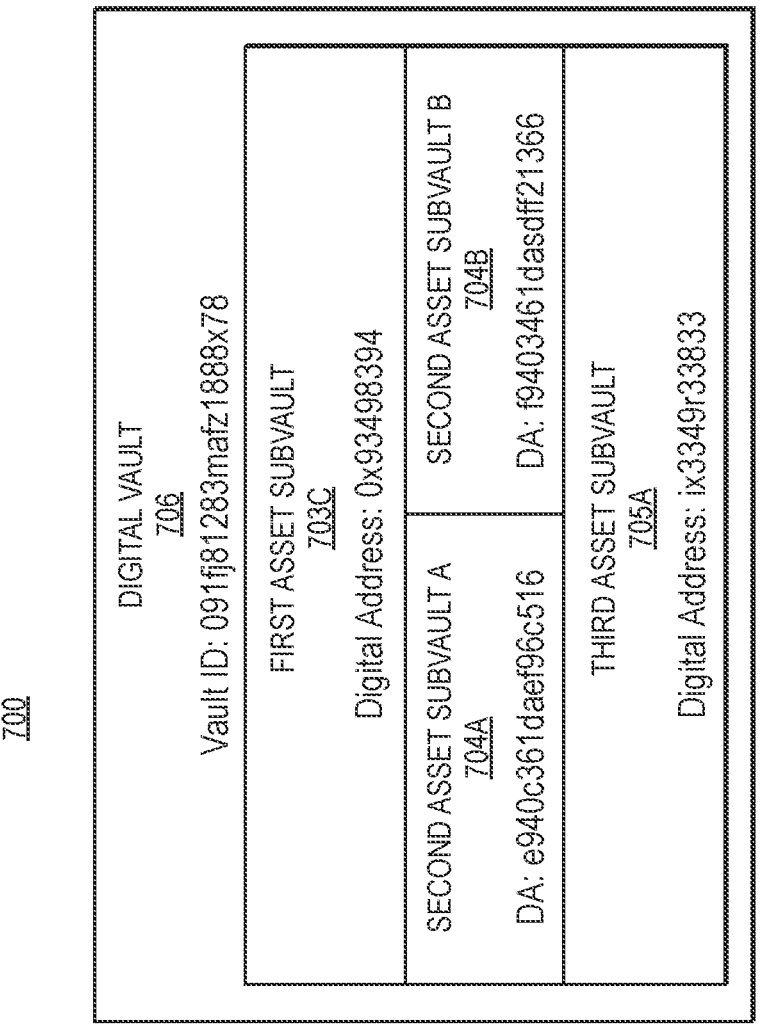
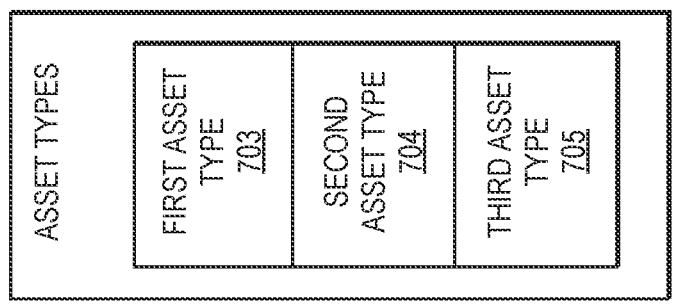
FIG. 7

DIGITAL CURRENCY AGGREGATION PROCESSING

CROSS-REFERENCE TO RELATED APPLICATIONS

The present application is a U.S. National Stage of PCT application No. PCT/US2021/038966, filed on Jun. 24, 2021 which claims priority to U.S. Provisional Patent Application No. 63/044,828 filed on Jun. 26, 2020, both of which are incorporated herein by reference for all purposes in their entirety.

BACKGROUND

The number of transactions performed in digital currencies have increased significantly. Digital currencies provide a different set of benefits as compared to fiat currencies. For example, a transaction of digital currency does not require a physical currency to be exchanged. A financial institution, such as a bank, may wish to expand their capabilities to take advantage of the benefits provided by digital currencies. Many methods and systems in place at banks are capable of processing transactions and are able to provide settlement in fiat currency. However, conventional settlement systems are not configured to process settlements using digital currencies.

Providing for a system that can process common transactions using digital currencies is difficult, especially because there are currently so many different types of digital currencies with different attributes.

Further, because many digital currencies (e.g., cryptocurrencies) use public ledgers, the settlement digital currencies can be problematic if large financial institutions publicly record their settlement payments or receipts on public ledgers.

Embodiments of the invention address this problem and other problems individually and collectively.

BRIEF SUMMARY

Embodiments of the invention are related to methods and systems of performing settlements between an acquirer and an issuer using digital currencies.

One embodiment is related to a method comprising: receiving, by a processing network computer a plurality of clearing files from a plurality of transport computers; generating, by the processing network computer, a settlement file comprising a first settlement amount and a first destination associated with a digital vault associated with the processing network computer at a custodian computer, based on data in the plurality of clearing files; transmitting, by the processing network computer to an authorizing entity computer, the settlement file comprising the first settlement amount and the first destination; and transmitting, by the processing network computer to the custodian computer, a transfer instruction file comprising the first destination, a second settlement amount and a second destination associated with one of the plurality of transport computers; and wherein the authorizing entity computer thereafter sends the first settlement amount or an amount equivalent to the first settlement amount to the first destination at the custodian computer and wherein the custodian computer or the processing network computer sends the second settlement amount to the second destination associated with the transport computer.

Another embodiment is related to a server computer comprising: receiving a plurality of clearing files from a plurality of transport computers; generating a settlement file comprising a first settlement amount and a first destination associated with a digital vault associated with the server computer at a custodian computer, based on data in the plurality of clearing files; transmitting to an authorizing entity computer, the settlement file comprising the first settlement amount and the first destination; and transmitting to the custodian computer, a transfer instruction file comprising the first destination, a second settlement amount and a second destination associated with one of the plurality of transport computers; and wherein the authorizing entity computer thereafter sends the first settlement amount or an amount equivalent to the first settlement amount to the first destination at the custodian computer and wherein the custodian computer or the server computer sends the second settlement amount to the second destination associated with the transport computer.

Yet another embodiment is related to a method comprising: receiving, by a custodian computer from a processing network computer, a transfer instruction file comprising a second settlement amount, a first destination associated with a digital vault at a custodian computer, and a second destination associated with a transport computer, wherein the processing network computer also transmits to an authorizing entity computer, a settlement file comprising a first settlement amount and the first destination; receiving, at the digital vault associated with the first destination at the custodian computer from an authorizing entity computer, the first settlement amount, or an amount equivalent to the first settlement amount, the first settlement amount or the amount equivalent to the first settlement amount being equal to the second settlement amount; and transmitting, by the custodian computer, a notification to the processing network computer that the first settlement amount or the amount equivalent to the first settlement amount was received by the custodian computer.

Further details regarding embodiments of the invention can be found in the Detailed Description and the Figures.

BRIEF DESCRIPTION OF THE DRAWINGS

FIG. 7 shows a block diagram of a digital vault.

DETAILED DESCRIPTION

Figure 1:
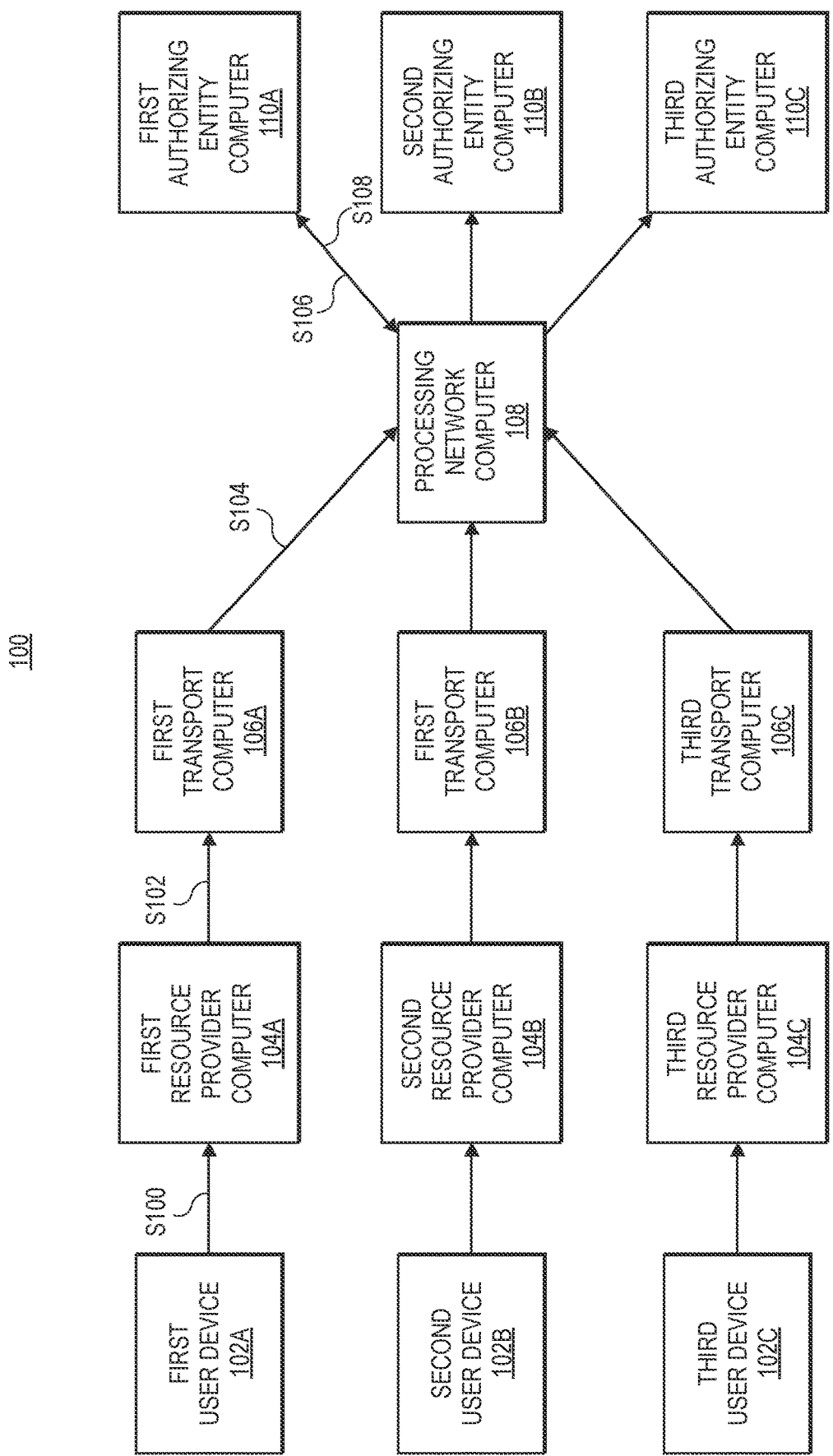
FIG. 1 shows a block diagram illustrating a payment processing system.

Prior to discussing embodiments of the invention, some terms can be described in further detail.

A "user" may include an individual. In some embodiments, a user may be associated with one or more user devices. The user may also be referred to as a cardholder, account holder, or consumer in some embodiments.

A "user device" may be any suitable device that is operated by a user. User devices may be in any suitable form. Some examples of user devices include cellular phones, a card (e.g., a payment card), PDAs, personal computers (PCs), tablet computers, and the like. In some embodiments, where a user device is a mobile device, the mobile device may include a display, a memory, a processor, a computer-readable medium, and any other suitable component.

A "mobile device" (sometimes referred to as a mobile communication device) may comprise any suitable electronic device that may be transported and operated by a user, which may also provide remote communication capabilities to a network. A mobile communication device may communicate using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g. cellular phones), PDAs, tablet computers, net books, laptop computers, wearable devices (e.g., watches), vehicles such as automobiles and motorcycles, personal music players, handheld specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "resource provider" can be any suitable entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a mobile device.

"Access data" may include any suitable data that can be used to access a resource or create data that can access a resource. In some embodiments, access data may be account information for a payment account. Account information may include a PAN (primary account number), payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. In other embodiments, access data could include data that can be used to access a location. Such access data may be ticket information for an event, data to access a building, transit ticket information, etc. In yet other embodiments, access data may include data used to obtain access to sensitive data. Examples of access data may include codes or other data that are needed by a server computer to grant access to the sensitive data.

An "authorizing entity" may be an entity that authorizes a request, typically using an authorizing computer to do so. An authorizing entity may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "blockchain" can be a distributed database that maintains a continuously-growing list of records secured from tampering and revision. A blockchain may include a number of blocks of interaction records. Each block in the blockchain can contain also include a timestamp and a link to a previous block. Stated differently, interaction records in a blockchain may be stored as a series of "blocks," or permanent files that include a record of a number of interactions occurring over a given period of time. Blocks may be appended to a blockchain by an appropriate node after it completes the block and the block is validated. Each block can be associated with a block header. In embodiments of the invention, a blockchain may be distributed, and a copy of the blockchain may be maintained at each full node in a verification network. Any node within the verification network may subsequently use the blockchain to verify interactions.

A "node" may be a point at which lines or pathways intersect or branch or can be a central or connecting point. A node can also be a "computer node," which can be any computer or device that connects to the verification network. A node that can fully verify each block and interaction in the blockchain can be a full node. A "full node" can store the full blockchain (i.e., each block and each interaction). In some embodiments, a "user device" may be a computer node in the verification network.

A "block header" can be a header including information regarding a block. A block header can be used to identify a particular block of a blockchain. A block header can comprise any suitable information, such as a previous hash, a Merkle root, a timestamp, and a nonce. In some embodiments, a block header can also include a difficulty value.

A "nonce" can include an arbitrary number. In some embodiments, a nonce can be a value that can be adjusted by a full node while performing a proof-of-work process. A nonce can be input into a hash function along with block data to determine the output hash value. A correct nonce (also referred to as a golden nonce) yields an output hash value that satisfies a predetermined criteria, such as being less than a difficulty value. A nonce can be of any suitable length (e.g., 32-bits).

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

FIG. 1 shows a block diagram illustrating a payment processing system 100. FIG. 1 shows three users operating user devices (e.g., a first user operating a first user device 102A) conducting transactions. However, any number transactions (conducted by any suitable number of users) may be conducted and processed by the system. For example, the first user may use the first user device 102A to pay for a good and/or service at a first resource provider. The resource provider may operate a first resource provider computer 104A. The first resource provider computer 104A may communicate with a first authorizing entity computer 110A operated by an authorizing entity such as an issuer, via a first transport computer 106A operated by an acquirer and a processing network computer 108 operated by a payment processing network. A second and third user may use similar methods to pay for a good and/or service at a different or same resource provider.

The first user device 102A, the first resource provider computer 104A, the first transport computer 106A, the processing network computer 108, and the first authorizing entity computer 110A may all be in operative communication with each other through any suitable communication channel(s) or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), ISO (e.g., ISO 8583) and/or the like.

As noted above, the processing network computer 108 may be a computer in a payment processing network. An exemplary payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

In step S100, a first user may use the first user device 102A to pay for a good and/or service at the first resource provider computer 104A. The user may choose to provide payment in any type of currency such as a fiat currency or digital currency. In some embodiments, the first resource provider computer 104A may include or be associated with an access device. The first user device 102A and the access device may interact such that access data from the user device 102A (e.g., a PAN, a payment token, verification value(s), expiration date, etc.) is received by the access device. The access data may be received by the first resource provider computer 104A.

In some embodiments, the access device may be a point of sale terminal and the access device may be used to conduct an in person transaction with the user. In other embodiments, the resource provider computer 104A can be a remote Web server and the first user device 102 may be remotely located with respect to the first user device 102A (as in the case of an e-commerce transaction).

In step S102, the first resource provider computer 104A may generate an authorization request message that includes the information received from the access device (e.g., information corresponding to the user device 102A) along with transaction information (e.g., a transaction amount, merchant specific information, etc.) and transmit the authorization request message to the first transport computer 106A.

In step S104, after receiving the authorization request message, the first transport computer 106A may process and forward the authorization request message to the processing network computer 108 to continue with the transaction authorization process.

In step S106, after receiving the authorization request message, the processing network computer 108 may proceed with the authorization process. In some cases, prior to the occurrence of a credit or debit transaction (e.g., a credit card or debit card transaction), the processing network computer 108 has an established protocol with each authorizing entity (e.g., each issuer) on how the authorizing entity's transactions are to be authorized. In some cases, such as when the transaction amount is below a threshold value, the processing network computer 108 may be configured to authorize the transaction based on information that it has about the first user's account without generating and transmitting an authorization request message to the first authorizing entity computer 110A. In other cases, such as when the transaction amount is above a threshold value, the processing network computer 108 may receive the authorization request message, determine the authorizing entity associated with the first user device 102A (e.g., by performing a lookup in a database that correlates authorizing entity computers to bank identification numbers (BINs) in account numbers), and forward the authorization request message for the transaction to the authorizing entity computer 110A for verification and authorization. In other embodiments, there is no threshold value and the processing network computer 108 can determine the authorizing entity associated with the first user device 102A (e.g., by performing a lookup in a database that correlates authorizing entity computers to bank identification numbers (BINs) in account numbers), and forward the authorization request message for the transaction to the authorizing entity computer 110A for verification and authorization.

In step S108, after receiving the authorization request message, the first authorizing entity computer 110A may generate an authorization response message (that may include an authorization code indicating the transaction is approved or declined) and transmit it to the processing network computer 108. The processing network computer 108 may then forward the authorization response message to the first resource provider computer 104A and any associated access device via the first transport computer 106A.

If the access data received in the authorization request message by the processing network computer 108 in step S106 is in the form of a token, then the processing network computer 108 may exchange the token for a real credential (e.g., a PAN). Any subsequent authorization request message may then be modified to include the real credential and it may be forwarded to the first authorizing entity computer 110A for verification. After an authorization response message with an approval or denial is received from the first authorizing entity computer 110A, the processing network computer 108 may replace the real credential with the token in the authorization response message and forward it to the first resource provider computer 104A and any associated access device via the first transport computer 106A.

At the end of the day or at some other suitable time interval, a clearing and settlement processing between at least the first transport computer 106A, the processing network computer 108, and the first authorizing entity computer 110A may be performed on the transaction and other transactions. As shown in FIG. 1, a plurality of users may conduct transactions, and they may be eventually cleared and settled. One or more files may be generated comprising, for example, the net total of funds which are transferred between issuers (i.e., operating the authorizing entity computer 110A, 110B, 110C) and acquirers (i.e., operating the transport computers 106A, 106B, 106C).

Figure 2:
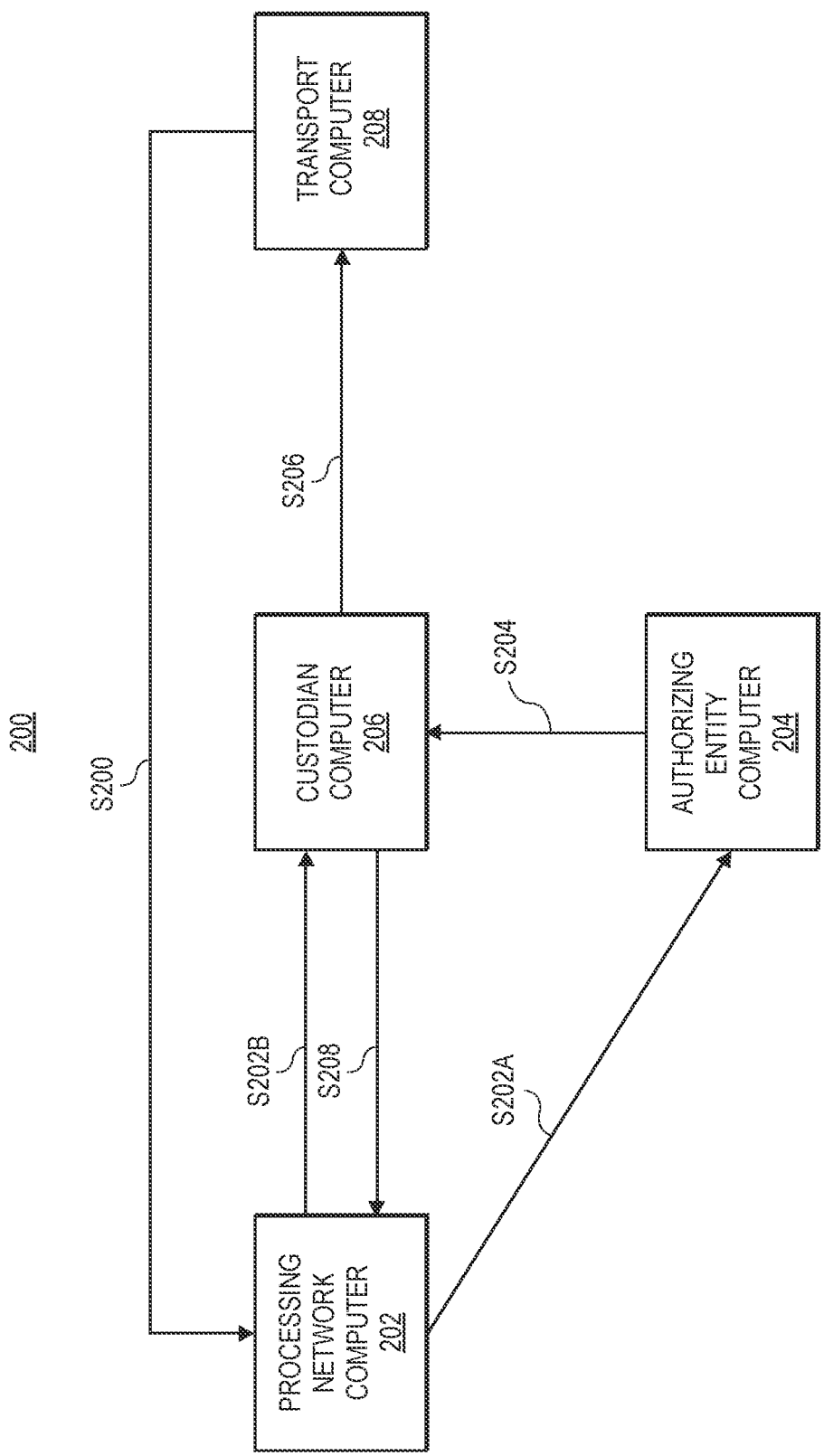
FIG. 2 shows a block diagram of a settlement system, and an overlaid process flow where transactions are cleared and settled in digital currencies.

FIG. 2 shows a block diagram of a settlement system 200, and an overlaid process flow according to embodiments of the invention. The system 200 can include a processing network computer 202, an authorizing entity computer 204, a custodian computer 206, and a transport computer 208. The processing network computer 202, authorizing entity computer 204, and transport computer 208 may maintain accounts which could be digital vaults that can store digital currencies. The digital currencies may be a central bank digital currencies or fiat-backed cryptocurrencies such as USD Coin, USD Tether, TrueUSD, Digix Gold Tokens (DGX), or other stablecoin.

The processing network computer 202 may include data processing subsystems, networks, and operations used to support and deliver authorization services, exception file services, and clearing and settlement services. An exemplary processing network may include VisaNet™. Processing networks such as VisaNet™ are able to process credit card transactions, debit card transactions, and other types of commercial transactions. Authorization, settlement, and clearing may be done at the same time (substantially simultaneously, e.g., within a few minutes or hours) or may be done as part of a batch settlement process (e.g., at the end of the day or week).

The processing network computer 202 may have or be associated with a processing network account computer (not shown in FIG. 2), which may be a bank account. The processing network may also have one or more digital vaults managed by the custodian computer 206 to store one or more digital currencies.

Authorizing entity computer 204 may be a computer operated by an authorizing entity such as an issuer, which may be a financial institution, such as a bank, that creates and maintains financial accounts for account holders. An issuer or issuing bank may issue and maintain financial accounts for consumers. The issuer of a particular consumer account of a consumer can determine whether or not to approve or deny specific transactions for the consumer. An issuer can authenticate a consumer and release funds to an acquirer if transactions are approved (e.g., a consumer's account has sufficient available balance and meets other criteria for authorization or authentication). The issuer may have one or more issuer accounts, which may include a bank or credit account (e.g., for holding fiat currency such as U.S. dollars) and/or a digital currency vault (e.g., for holding cryptocurrencies based upon fiat currencies).

The custodian computer 206 can be a computer that manages digital assets for other entities. The custodian computer 206 can securely store digital currencies, provide access to the digital currencies, and transfer assets for entities that use the custodian computer 206. The custodian computer 206 can also manage a plurality of digital vaults for various entities. The plurality of digital vaults can include master vaults, receiving vaults to receive external funds, and trading vaults to transmit funds and convert funds between digital currencies and fiat currencies.

The transport computer 208 may be operated by an acquirer which may be a financial institution associated with a resource provider. Acquirers typically provide a resource provider with a bank account, and in some cases, transaction accepting infrastructure. Generally, after a transaction has been authorized and as part of the settlement process, funds are transferred from the issuer to a resource provider's account at the acquirer. The acquirer may also communicate with the resource provider regarding the status of a payment transaction. The acquirer can also operate the transport computer 208. In embodiments of the invention, the acquirer may have one or more acquirer accounts, which may include a bank account (e.g., for fiat currency such as U.S. dollars) and/or a digital currency vault (e.g., for cryptocurrencies based upon or not based upon fiat currencies).

Returning to FIG. 2, a digital currency settlement process according to embodiments of the invention can be described. In a digital currency settlement process according to an embodiment of the invention, both parties to the settlement will settle in digital currency (e.g., cryptocurrency).

In step S200, the transport computer 208 operated by the acquirer may transmit a clearing file to the processing network computer 202. The clearing file may comprise data on a plurality of transactions (e.g., account numbers used to conduct the transactions, transaction type codes, transaction amounts, transaction dates, resource provider identifiers, authorization codes, authorization methods, authentication methods, etc.), such as the transactions executed in FIG. 1, and a digital address (e.g., 0x394893453) associated with a digital vault of the transport computer 208. For example, the clearing file may contain data on the transactions conducted by the resource providers and their resource provider computers that are associated with their acquirers. In some embodiments, the clearing file may also contain net amounts of funds (e.g., a second settlement amount) that are requested from the various authorizing entities (e.g., issuers) associated with the users that conducted transactions with those resource providers and/or resource provider computers. The transport computer 208 may additionally provide an indication to request settlement in digital currency in the clearing file.

In step S202A, the processing network computer 202 can generate and send a settlement file to an authorizing entity computer 204 with instructions to begin a digital currency settlement. The processing network computer 202 can send other settlement files to other authorizing entity computers. The settlement file sent to the authorizing entity computer 204 can include a first settlement amount (e.g., an amount of digital currency to be sent), and a first destination associated with the payment network computer 202 (e.g., a digital address such as 0x93498394) to which the settlement funds should be transferred. The first destination can be a digital address (e.g., a public cryptographic key) for a digital vault (e.g., a processing network vault) associated with the processing network computer 202 at the custodian computer 206.

In step S202B, the processing network computer 202 can also generate and send a transfer instruction file to the custodian computer 206 with settlement instructions. The transfer instruction file can include a second settlement amount to be transferred (e.g., an amount of digital currency to be sent), a second destination (e.g., the digital address associated with the digital vault of the transport computer 208 received in step S200) for the amount, and an origination address associated with an account associated with the payment network computer 202. In some embodiments, the second destination may be a digital address in the form of a public cryptographic key. The second settlement amount may be the same as the first settlement amount, or have a value equivalent to the first settlement amount. For example, the first settlement amount may be ten units of a first digital currency, and the second settlement amount may be ten units of the same digital currency or an equivalent amount of a second digital currency. In some embodiments, each of the first and second settlement amounts are digital currencies.

In step S204, the authorizing entity computer 204 can transfer the first settlement amount from an issuer account (e.g., a digital currency account at the authorizing entity computer 204 or elsewhere such as at the custodian computer 206) to the processing network vault at the first destination provided by the processing network computer 202, which is managed by the custodian computer 206.

In step S206, the custodian computer 206 can transfer the second settlement amount from the processing network vault to the second destination associated with an acquirer account associated with the transport computer 208. In some embodiments, that may include debiting the processing network vault and then crediting the acquirer account associated with the transport computer 208.

In step S208, the custodian computer 206 can send a message to the processing network computer 202 indicating that the settlement has been completed. The message may specifically send a confirmation of payment sent, funds received from the authorizing entity computer 204, and a balance of the processing network vault back to the processing network computer 202.

Figure 3:
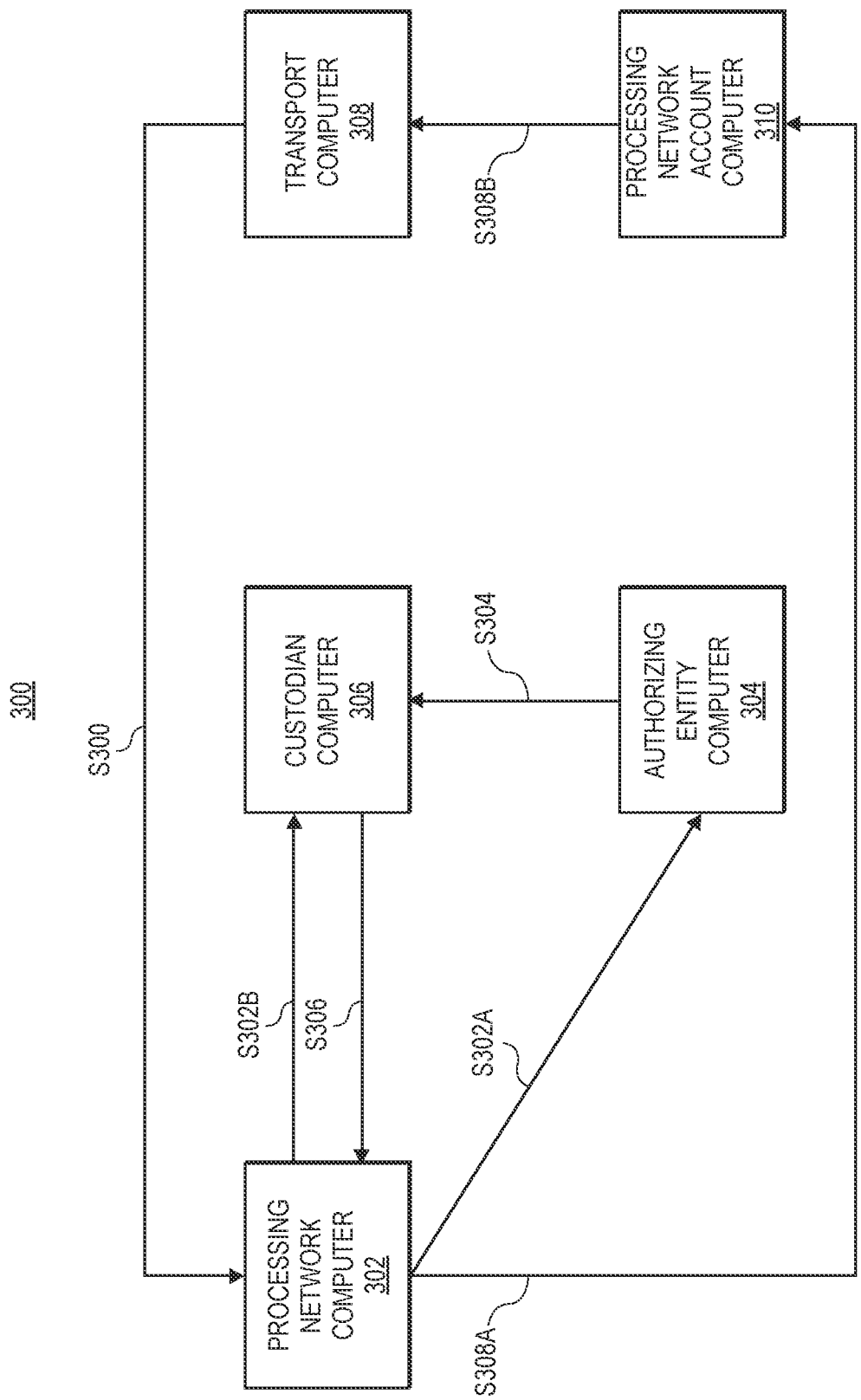
FIG. 3 shows a block diagram of another settlement system, and an overlaid process flow where a transactions are cleared and settle in both digital and fiat currencies.

FIG. 3 shows a block diagram of another clearing and settlement system 300, and an overlaid process flow where a transactions are cleared and settle in both digital and fiat currencies according to another embodiment of the invention. The settlement system 300 shares common components with the settlement system of FIG. 2. However, FIG. 3 also shows a processing network account computer 310. The processing network account computer 310 may maintain an account for the processing network associated with the processing network computer 302, which may include a bank account (e.g., for fiat currency such as U.S. dollars). In some embodiments, the processing network account computer 310 may be operated by a financial institution. The settlement system 300 of FIG. 3 includes a transport computer 308 which requests settlement in fiat currency. The underlying transactions conducted by the merchants associated with the acquirer operating the transport computer 308 may have been conducted in fiat currency or digital currency.

In step S300, the transport computer 308 may transmit a clearing file to the processing network computer 302. The clearing file may be similar to the clearing file described with respect to step S200 of FIG. 2, which comprises data on a plurality of transactions, and an account identifier or address of the transport computer 308. In this embodiment, the plurality of transactions may have been conducted in a particular type of digital currency, or they could have been conducted in fiat currency. As in the embodiment in FIG. 2, the clearing file may contain the net amount of funds (e.g., a second settlement amount) that are requested from the issuer operating the authorizing entity computer 304. The transport computer 308 may additionally include an indication in the clearing file to request settlement in fiat currency.

In step 302A, the processing network computer 302 can send a settlement file to an authorizing entity computer 304 with instructions to begin a digital currency settlement. The settlement file can include a first settlement amount (e.g., an amount of digital currency to be sent by the authorizing entity computer 304) and a first destination associated with the payment network computer 302 (e.g., a digital address such as 0x93498394) to which the settlement funds should be transferred. The first destination can be a digital address (e.g., a public cryptographic key) for a digital vault (e.g., a processing network vault) associated with the processing network computer 302 at the custodian computer 306.

In step S302B, the processing network computer 302 can send a transfer instruction file to the custodian computer 306 with settlement instructions. The transfer instruction file can include a second settlement amount to be transferred (e.g., an amount of fiat currency that will be sent by the processing network account computer 310 to the transport computer 308), a second destination associated with the authorizing entity computer 304. In some embodiments, the second destination may be a digital address, such as a public cryptographic key, for a digital vault associated with the authorizing entity computer 304. In some embodiments, the second settlement amount may have a value equivalent to the first settlement amount. For example, the first settlement amount may be ten units of a first digital currency, and the second settlement amount may be ten units of an equivalent amount of a fiat currency. The transfer instruction file may include a request that the custodian computer 306 notify the processing network computer 302 when the first settlement amount is received by the custodian computer 306 from the second destination (e.g., an address associated with the authorizing entity computer). For example, the custodian computer 306 may send a notification, in step S306, when digital currency (e.g., the first settlement amount) is received from the authorizing entity computer 304 (e.g., the second destination).

In step S304, the authorizing entity computer 304 can transfer the first settlement amount (e.g., in digital currency) from an issuer account (e.g., a digital currency account at the authorizing entity computer 304) to the processing network vault at the first destination provided by the processing network computer 302, which is managed by the custodian computer 306. In some embodiments, the authorizing entity computer 304 may send an amount equivalent to the first settlement amount to the custodian computer. For example, in step S302A, the processing network computer 302 may send a message to the authorizing entity computer 304 to settle in fiat currency. The authorizing entity computer 304, however, may send an equivalent amount of digital currency to the custodian computer 306 to settle the obligation to the acquirer associated with the transport computer 308.

In step S306, after receiving the first settlement amount, or equivalent amount, the custodian computer 306 can send a message to the processing network computer 302 indicating that the first step of the settlement has been completed. The custodian computer 306 may verify the first settlement amount and the second settlement amount have the same value before sending the message to the processing network computer 302. The balance of the digital vault which received the first settlement amount may be in the message. In some embodiments, the custodian computer 306 may transfer the second settlement amount to a trading vault in the custodian computer 306 to be converted into fiat currency. The trading vault can be an account that holds funds that are being converted between digital fiat backed currencies and fiat currencies.

In steps S308A and S308B, the processing network 302 can transfer the second settlement amount as fiat currency from an account at the processing network account computer 310 to an acquirer account at the transport computer 308, thus completing the settlement process.

The settlement systems of FIG. 2 and FIG. 3 allow an issuer operating an authorizing entity computer and an acquirer operating a transport computer to settle using digital currency. The acquirer may request to be paid in either digital currency (e.g., the system of FIG. 2) or fiat currency (e.g., the system of FIG. 3), and the issuer is able to fund the payment in digital currency or fiat currency.

Figure 4:
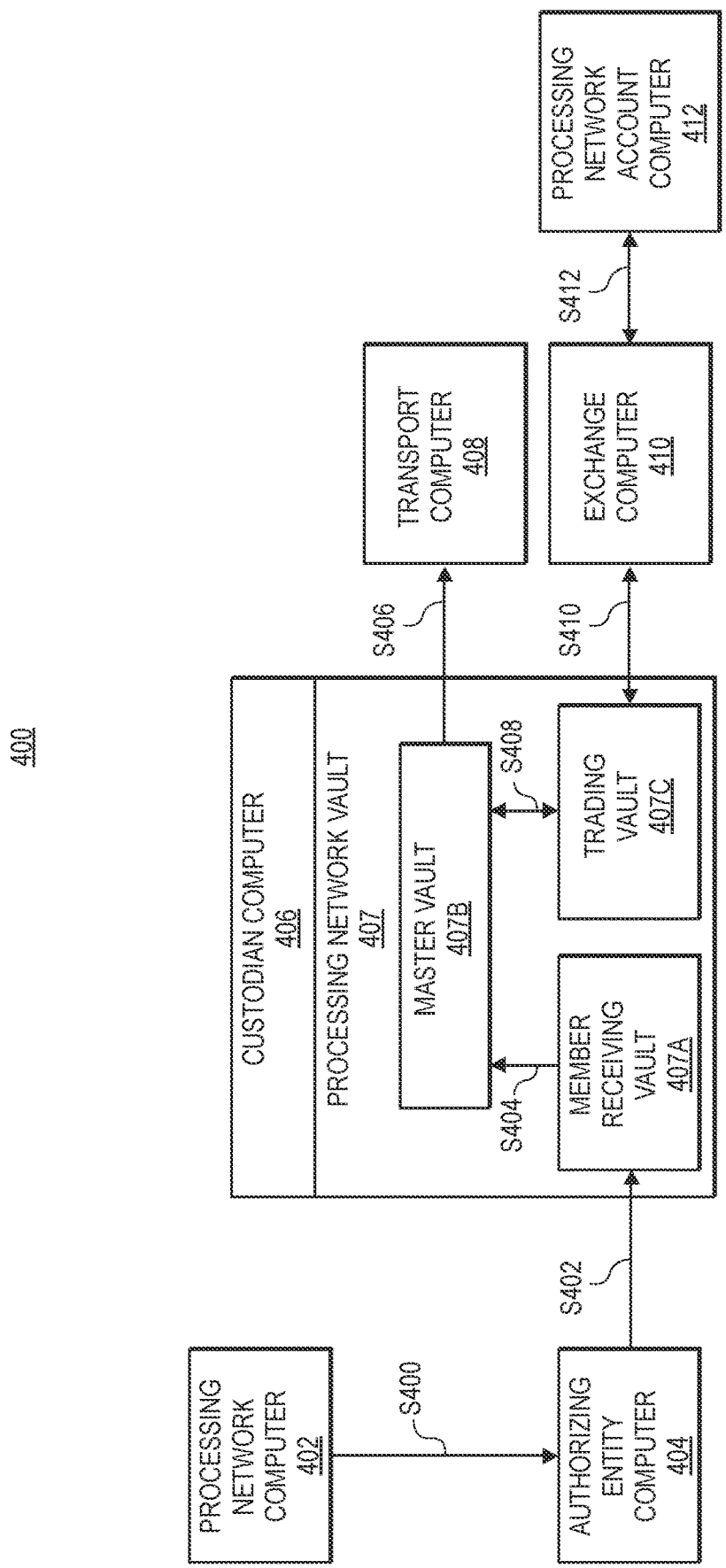
FIG. 4 shows a block diagram of a settlement system using digital vaults, providing settlement capabilities in both digital and fiat currencies.

FIG. 4 shows a block diagram of a settlement system 400 providing settlement capabilities in both digital and fiat currencies using digital vaults. The settlement system 400 can be used in conjunction with the methods and systems described with respect to FIGS. 2-3.

The system shown in FIG. 4 comprises a number of common components with FIG. 3 and descriptions thereof need not be repeated here. The custodian computer 406 maintains a plurality of vaults associated with the processing network including a master vault 407B, a receiving vault 407A, and/or a trading vault 407C. The vaults may be referred to collectively as processing network vault 407.

An exchange computer 410 may be associated with the custodian computer 406. The exchange computer 410 may communicate with external devices (not shown in the figures) to exchange fiat currency for digital currency, or digital currency for fiat currency. Traditional settlement systems may be used if both the issuer and acquirer choose to settle using fiat currency. If the acquirer wishes to settle in digital currency and the issuer chooses to settle using fiat currency, the authorizing entity computer 404 may transmit the amount of fiat currency to the processing network account computer 412 instead of the custodian computer 406. Then, the custodian computer 406 may receive notification of the fiat currency payment from the processing network account computer 412 and then continue with the method of FIG. 3.

In step S400, the processing network computer 402 may receive a number of clearing files, similar to the clearing files described above with respect to FIGS. 2 and 3. The processing network computer 402 may then generate a settlement file describing settlement transactions to be completed, similar to step S202A of FIG. 2. The processing network computer 402 then sends a message to the authorizing entity computer 404 indicating the amount that the authorizing entity computer 404 owes to the processing network computer 402. Similar to the methods and systems described above with respect to FIGS. 2 and 3, the authorizing entity computer 404 may be operated by an issuer.

In step S402, the authorizing entity computer 404 can transfer funds as digital currency to the member receiving vault 407A of the processing network vault 407 maintained by the custodian computer 406. The digital currency is transferred from an issuer vault (e.g., a digital currency account associated with the authorizing entity computer 404) to the member receiving vault 407A. In some embodiments, the digital address of the member receiving vault 407A, or the member receiving vault 407A itself, may be unique to the authorizing entity computer 404. The unique digital address may provide privacy, as many digital currency transactions are visible on a public blockchain. As the digital address may be unique, the issuer operating the authorizing entity computer 404 will not easily be able to view transactions between the processing network and a different external entity.

In step S404, the custodian computer 406 may transfer the funds from the member receiving vault 407A to a master vault 407B in the processing network vault 407. The master vault 407B may be a digital currency account for the processing network computer 402. The master vault 407B may a store a plurality of types of digital currency. The master vault 407B may also receive funds from or provide funds to other member receiving vaults from other authorizing entities (e.g., issuers) or acquirers.

The transfer of value from the member receiving vault 407A specifically associated with the authorizing entity computer 404 and the master vault 407B specifically associated with the processing network computer can occur internally within the processing network vault 407 in the custodian computer 406. The advantage of doing so is that any specific funds (e.g., digital or fiat) provided by the master vault to an external entity such as the transport computer 408 is anonymized with respect to the authorizing entity computer 404. For example, the authorizing entity computer 404 in step S402 may transfer one million USDC to the member receiving vault 407A for settlement obligations to one or more acquirers. That one million USDC from the authorizing entity computer 404 would then be transferred to the master vault 407B at some point in time (assuming that the member receiving vault 407A does not already have the funds to settle the authorizing entity computer's obligations. The master vault 407B can then transfer funds to the one or more acquirers for any obligations owned by the various issuers. Because the master vault 407B receives funds from many member receiving vaults used by different members, and provides funding to the various acquirers operating their transport computers, there is no direct link between the funds transfer that was sent by the authorizing entity computer 404 in step S402 and the funds that are ultimately provided to the transport computer 408. As such, the amounts ultimately paid out by the various authorizing entity computers can be obscured as to the intended recipients of the funds transfers. This can be compared to a situation in which the payment of one million USDC is made from the authorizing entity computer 404 to the transport computer 408 for settlement obligations, and that payment is written to a public ledger. In this case, the public may be able to determine the details of such a transaction. Thus, embodiments of the invention can provide for effective ways to maintain transaction privacy between entities such as issuers and acquirers, even when transactions are conducted using digital currencies.

If the funds are to be paid out to an acquirer operating a transport computer 408 as digital currency (e.g., such as during the settlement process described in FIG. 2), the settlement process can move to step S406. In step S406, the custodian computer 406 can transfer the funds from the master vault 407B to an acquirer vault at the transport computer 408, or stored at the custodian computer 406 on behalf of the transport computer 408 or the acquirer operating the transport computer 408. The acquirer vault may be, for example, the digital currency vault of the acquirer operating the transport computer 408.

If the processing network computer 402 wants to convert an some of the digital currency in the master vault 407A to a fiat currency, for example, to pay out the funds as fiat currency to an acquirer (e.g., such as during the settlement process described in FIG. 3), the process can move to step S408 from step S404. In step S408, the custodian computer 406 may transfer an amount of digital currency from the master vault 407B to a trading vault 407C of the processing network vault 407.

In step S410, the funds in the trading vault may be exchanged into fiat currency and deposited into an account maintained at the processing network account computer 412 via an exchange computer 410. The exchange computer 410 may be associated (e.g., operated by the same party) with the custodian computer 406. The exchange computer 410 may communicate with external devices to convert between digital currency and fiat currency. For example, the exchange computer 410 may be a digital currency exchange, which may buy and sell digital currencies on various digital currency platforms by interacting with their networks (e.g., Bitcoin, Etherium, etc.).

In step S412, after the exchange computer 410 converts between the currency types, the exchange computer 410 sends the currency amount for the processed currency type to the processing network account computer 412. This allows funds received as digital currency (e.g., from the authorizing entity computer 404) to be converted to fiat currency, which can be used as payment to an acquirer operating the transport computer as in step S308B of FIG. 3.

Alternatively, the processing network account computer 412 may provide funds to the exchange computer 410. For example, the processing network account computer 412 may provide an amount of fiat currency that will be converted to digital currency via the exchange computer 410. The exchange computer 410 may then send the digital currency to the trading vault 407C. The trading vault 407C may then transfer the digital currency to the master vault 407B. This allows the processing network to receive a payment for a settlement from the issuer operating the authorizing entity computer 404 in fiat currency and provide the settlement amount to the acquirer operating the transport computer 408 in digital currency.

Figure 5:
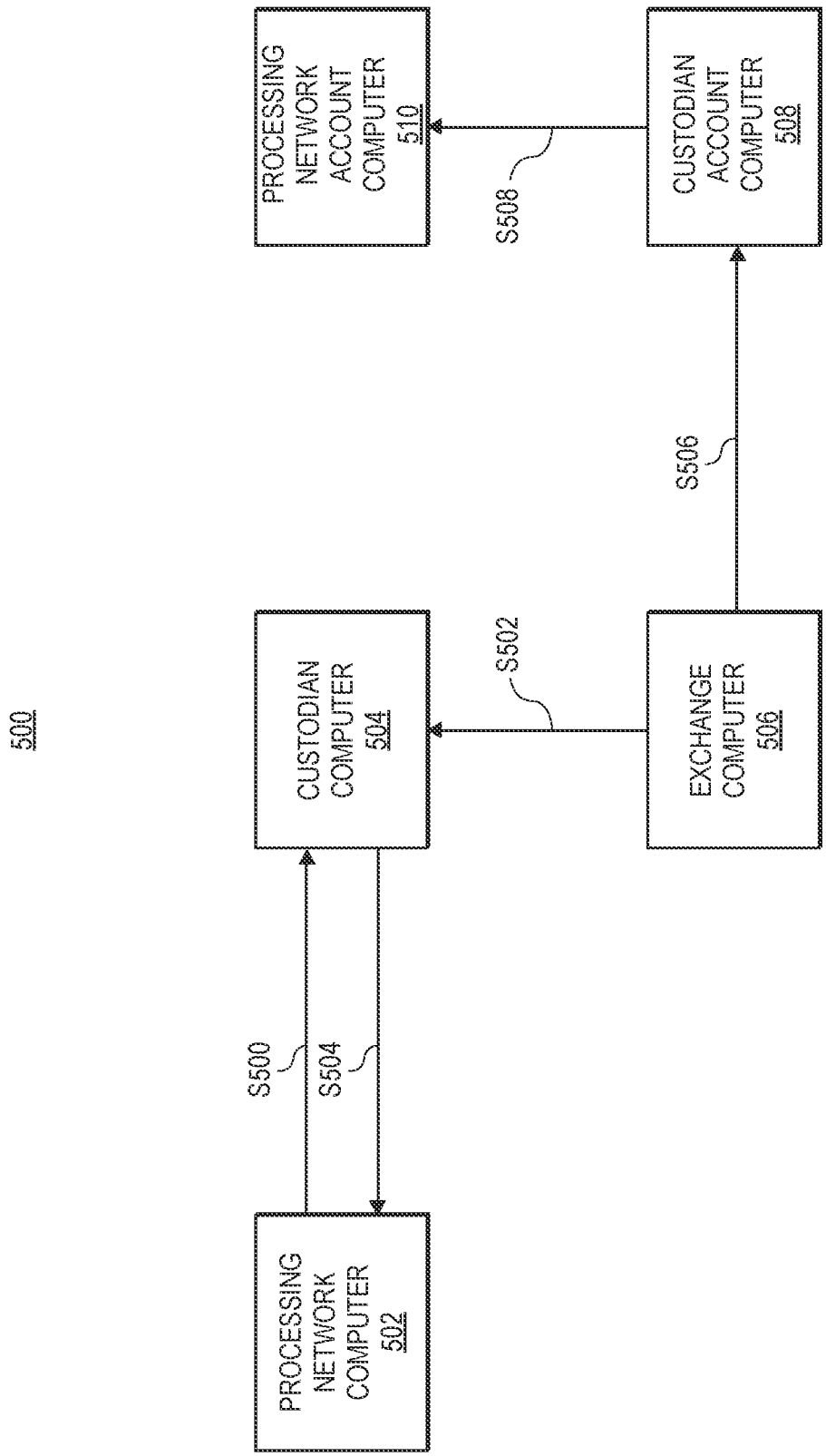
FIG. 5 shows a block diagram of a system used to exchange digital currency to fiat currency.

FIG. 5 shows a block diagram of a system 500 that can be used to exchange digital currency to fiat currency according to embodiments of the invention. The process illustrated in FIG. 5 can be performed, for example, after step S306, but before step 308A in FIG. 3. This process can be used in the event that the processing network computer or an account of the processing network computer does not have sufficient funds to pay an acquirer.

In step S500, the processing network computer 502 may send a message comprising a first exchange amount and a second exchange amount to a custodian computer 504. In some embodiments, the message may further comprise a digital address associated with the processing network computer 502, so that the second exchange amount can be added to an account associated with the processing network computer 502. The custodian computer 504 may store the digital address to be used in subsequent exchanges. In this example, the first exchange amount may be an amount of digital currency to be exchanged for a second exchange amount of fiat currency. For example, the processing network can instruct that $1M USDC, an example of the first exchange amount, be exchanged for $1M USD, an example of the second exchange amount.

In step S502, the custodian computer 504 can exchange the amount of digital currency for the equivalent amount of fiat currency via an exchange computer 506 operated by the party operating the custodian computer 504. In some embodiments, the custodian computer 504 first transfers the amount of digital currency into a trading vault from a master vault of the processing network vault before completing the exchange.

In step S504, the custodian computer 504 can notify the processing network computer 502 via a notification message that the digital currency has been removed from the processing network vault maintained by the custodian computer 504. A balance of the processing network vault may also be included in the notification message.

In step S506, the exchange computer 504 can deposit the amount of fiat currency (e.g., $1M USD) into a custodian account maintained at a custodian account computer 508. The custodian account may be a bank account associated with the custodian computer 504. The custodian account computer 508 may be a financial institution computer such as a bank computer that holds an account for a custodian operating the custodian computer 504.

In step S508, the custodian account computer 504 may transfer the amount of fiat currency into a processing network account (e.g., a bank account) at a processing network account computer 510 from the custodian account. In some embodiments, a wire transfer or ACH transfer can proceed from the custodian computer to an account (e.g., a settlement account) associated with the processing network.

Figure 6:
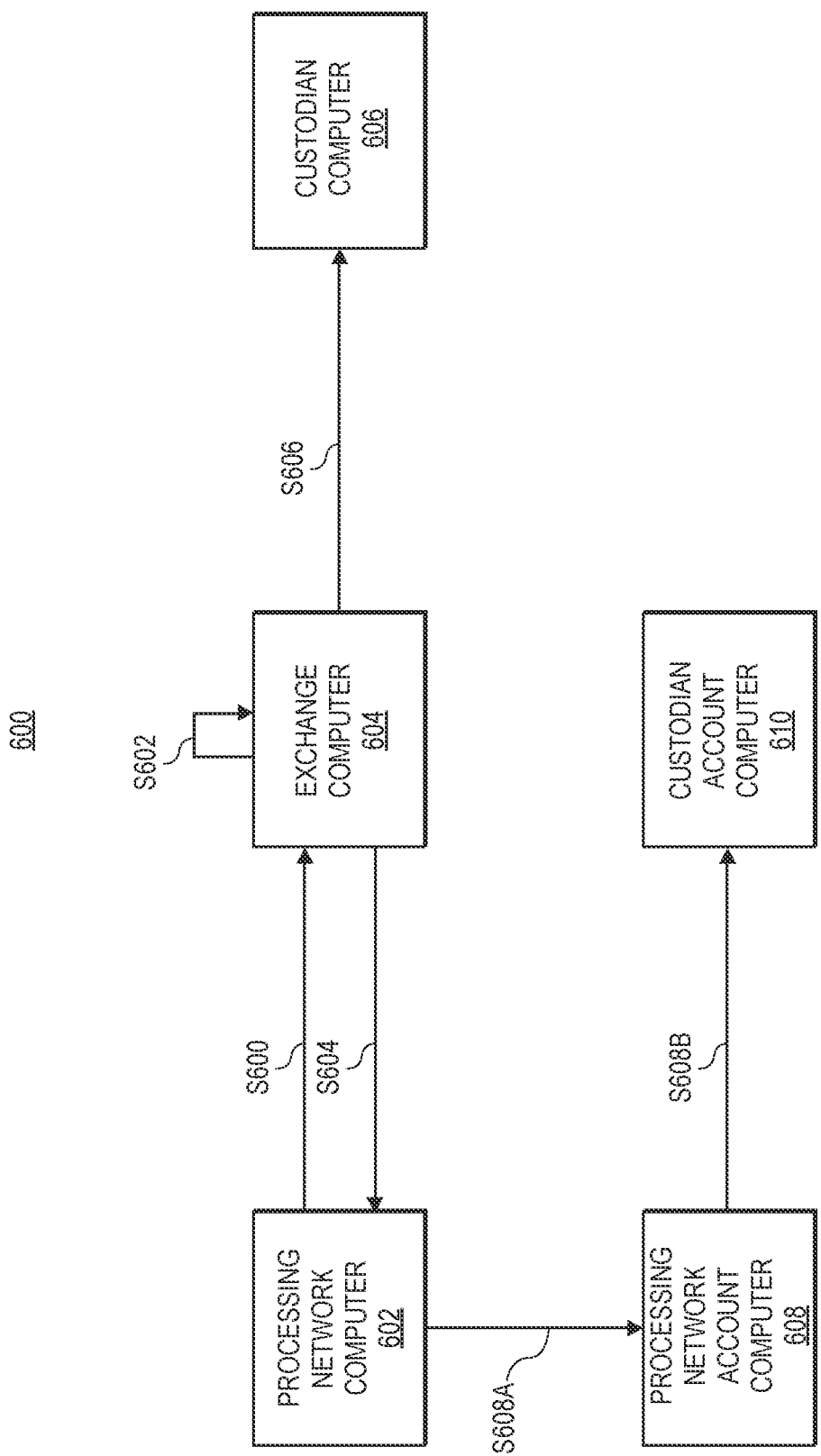
FIG. 6 shows a block diagram of a system used to exchange fiat currency to digital currency.

FIG. 6 shows a block diagram of a system 600 used to exchange fiat currency to digital currency. The process illustrated in FIG. 6 can be performed, for example, before step S206 in FIG. 2. This process can be used in the event that the processing network computer or an account (or vault) of the processing network computer does not have sufficient funds to pay an acquirer.

In step S600, the processing network computer 602 may send a message, comprising instructions to exchange a first exchange amount for a second exchange amount to an exchange computer 604. In some embodiments, the message may further comprise a digital address of the processing network computer 602, similar to the message seen in step S500 of FIG. 5. For example, the processing network computer 602 can send instructions to exchange an amount of fiat currency for an equivalent amount of digital currency to the exchange computer 604 associated with a custodian computer 606. For example, the processing network computer 602 may instruct the exchange computer 604 to exchange $1M USD into $1M USDC.

In step S602, the exchange computer 604 may exchange the amount of fiat currency for the equivalent amount of digital currency. For example, the exchange computer 604 may communicate with one or more external computers (e.g., a cryptocurrency blockchain network that is not shown in the figure) to facilitate the transfer the amount of fiat currency for the equivalent amount of digital currency.

In step S604, the exchange computer 604 can notify the processing network computer 602 that the exchange has been completed.

In step S606, the amount of digital currency can be deposited into a processing network vault at the custodian computer 606. For example, $1M USDC can be deposited into the processing network vault. In some embodiments, the digital currency is deposited into a trading vault, and then transferred to a master vault.

In steps S608A and S608B, after receiving notification from the exchange computer 604 that the exchange has been completed, the processing network computer 602 may transfer the amount of fiat currency from a processing network account (e.g., a bank account of the processing network) at a processing network account computer 608 to a custodian account (e.g., a bank account of the custodian computer) at a custodian account computer 610. For example, the processing network can transfer $1M USD to the custodian account, wherein a wire or ACH transfer may be used.

The systems of FIG. 5 and FIG. 6 enable the processing network to process settlements regardless of the type of currency that is received. The processing network is able to receive a payment from an issuer for a settlement in fiat or digital currency and can transmit the payment to an acquirer in fiat or digital currency.

FIG. 7 shows a block diagram of an exemplary digital vault 706 according to embodiments of the invention.

The digital vault 706 may be a digital currency vault that is associated with a vault ID. The vault ID may be an alphanumeric string, such as 091fj81283mafz1888x78, that identifies the particular vault. For example, a processing network computer or a custodian computer may use the vault ID to identify a particular vault. The digital currency vault may store a plurality of digital currencies as different asset types. For example, the digital currency vault may store a first asset type 703, a second asset type 704, and a third asset type 705. The asset types may be digital currencies.

Each asset type may be associated with an asset ID. The asset ID may be an alphanumeric identifier that identifies the particular digital currency type. In some embodiments, the asset ID may be unique to the digital currency vault.

In some embodiments, each asset in the digital currency vault may be further divided into a plurality of subvaults. For example, the second asset type 704 received from one external entity may be stored in first subvault second asset type ID A 704A while second asset type 704 received from a different external entity may be stored in a second subvault second asset type ID B 704B. Each subvault may be associated with a unique digital address. For example, the first asset type ID 703C may have a digital address of 0x93498394. The digital address may point to an account on a blockchain. After an external entity (e.g., an issuer or acquirer) receives a digital address (e.g., as part of a settlement message), the external entity may be able to see all digital currency transactions into and out of the subvault via the blockchain. By providing each external entity with a unique digital address to a unique subvault, transaction information for each external entity may be held private from other external entities.

In some embodiments, data security may be further enhanced by periodically rotating digital addresses. For example, the processing network computer or custodian computer may change the digital address for a subvault after set time period, or after a set number of deposit transactions.

The processing network (or custodian computer) can also determine a first digital address associated with an asset in a digital currency vault. The processing network can then send the first digital address (e.g., 0x93498394) to an authorizing entity computer in a first settlement file, allowing the authorizing entity computer and the processing network computer to conduct the first settlement with the first digital address.

Figure 8:
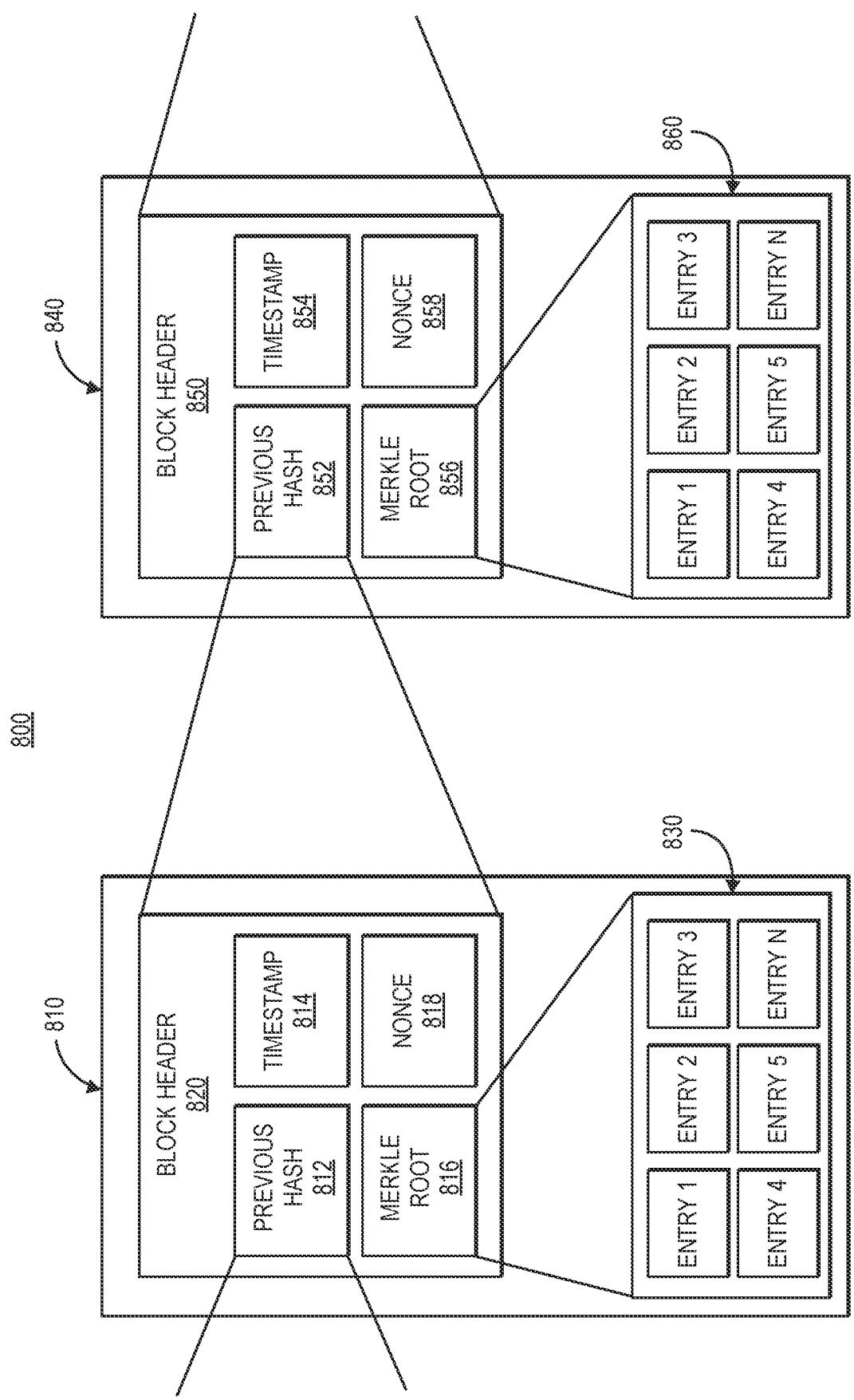
FIG. 8 shows a block diagram of a blockchain.

FIG. 8 shows a block diagram of a blockchain. A blockchain may be used when transferring digital currencies from one digital vault to another, or from one entity to another as described above. For example, the transfers seen in steps S204 and S206 of FIG. 2 may be executed on a blockchain. FIG. 8 includes a blockchain 800 comprising a first block 810 and a second block 840. The blockchain 800 can include any suitable number of blocks (e.g., 10, 500, 2000, 500000, etc.).

Current blockchain technologies, such as Bitcoin and Ethereum, maintain an append-only ledger in a network. The ledger includes a list of blocks of transaction data, the blocks are cryptographically chained together. A block is created by a computationally intensive process called proof-of-work in which valid blocks need to demonstrate a sufficient "difficulty" (i.e., sufficient computation power to create on average). If there are more than one available chains of blocks, then network participants, i.e., nodes, can download all blocks in all chains and follow the chain which has the highest total difficulty. This mechanism guarantees that, in the long run, the network will agree on a single and valid chain, see [Garay et al, The Bitcoin backbone protocol: Analysis and applications. In *Advances in Cryptology—EUROCRYPT* 2015, pages 281-310, 2015], [Bitcoin Website. http://www.bitcoin.org/], and [Rafael Pass, Lior Seeman, and Abhi Shelat. Analysis of the blockchain protocol in asynchronous networks. In Jean-Sébastien Coron and Jesper Buus Nielsen, editors, *Advances in Cryptology—EUROCRYPT* 2017, pages 643-673, Cham, 2017. Springer International Publishing.], which are all incorporated herein by reference for all purposes.

The blockchain 800 can create a history of data deposits, messages, or entries in a series of blocks where each block contains a mathematical summary, called a hash, of the previous block. This creates a chain where any changes made to a block will change that block's hash, which must be recomputed and stored in the next block. This changes the hash of the next block, which must also be recomputed and so on until the end of the chain.

Although the hash can be simple to compute, rules may be imposed, which require the value of the hash to be below a certain threshold value (i.e., a difficulty value). In addition, the hash is based on a type of mathematical function that is not reversible. One cannot predict what input can be used to produce the desired output. A valid hash is found by repeatedly adjusting a changeable value in the block, and recalculating the hash until it meets the validity requirements. The freely changeable value can be a nonce. The unpredictable nature of the hash considerably increases the difficulty of finding a nonce that produces a valid hash of the block.

As an example, the first block 810 can include a block header 820 and block entries 830. The block header 820 of the first block 810 can comprise a previous hash 812, a timestamp 814, a Merkle root 816, and a nonce 818.

The previous hash 812 can be a hash of the previous block's header. The previous hash 812 can be the result of a non-reversible mathematical computation using data from the previous block as the input. According to some embodiments, the computation used can include a SHA256 hash function. One of ordinary skill in the art would recognize that any suitable hash function could be used without departing from the spirit and scope of the present invention. The hash function can be designed so that any change to the data in the previous block results in an unpredictable change in the hash of that block. The previous hash 812 can be a link between blocks, chaining them together to form the blockchain 800.

When calculating the previous hash 812 for the previous block, a node can determine if the previous hash 812 can meet certain criteria defined by a difficulty value. In some embodiments, the difficulty value may include a number that the calculated hash must be less than. However, because the output of the hashing function is unpredictable, the output cannot be determined what input will result in an output that is less than the difficulty value before the hash is calculated. The nonce 818 can be used to vary the data content of the block, allowing for a large number of different outputs to be produced by the hash function in pursuit of an output that meets the difficulty value. This makes can make it computationally expensive to produce a valid block with a nonce 818 that produces a hash value meeting the criteria of the difficulty value.

The hash algorithms used for the previous hash 812 can include MD5, SHA-1, SHA-224, SHA-256, SHA-384, SHA-512, SHA-512/224, SHA-512/256, SHA-3 or any suitable hash function. There is also no requirement that a hash be computed only once. The results of a hash function may be reused as inputs into another or the same hash function again multiple times in order to produce a final result. One of ordinary skill in the art would recognize that any hash function could be used to compute the required hashing without departing from the spirit and scope of the present invention.

The Merkle root 816 can be a root of a Merkle tree, which can include a tree in which every leaf node is labelled with the hash of a data block, for example an entry. Each leaf of the Merkle tree can represent one of the entries. Each entry can be hashed together with a sibling node (i.e., entry) in the Merkle tree. Successively hashing sibling nodes in the Merkle tree can result in the Merkle root 816.

The block entries 830 can include settlement data and/or exchange data. For example, ENTRY 1 may be a settlement between an authorizing entity computer and a custodian computer, ENTRY 2 may be an exchange between a custodian computer and an external computer, etc. The block entries 830 can include any suitable number of entries. In some embodiments, the number of entries in the block entries 830 may be limited by the overall size of the block (e.g., the first block 810). For example, the blocks on the blockchain may be limited by a certain amount of data (e.g., ½ MB, 1 MB, 2 MB, 5 MB, 10 MB, etc.). In other embodiments, the number of entries in the block entries 830 may be a predetermined number of entries. For example, the nodes in the verification network can determine that 1, 10, 150, 500, 1000, etc. entries can be included in the block entries 830.

The timestamp 814 can include a time that the block was created within a certain range of error. According to some embodiments of the present invention, the full nodes of the verification network can check the timestamp 814 against their own known time and can reject any block that seems to have an erroneous timestamp 814.

The nonce 818 can be a value adjusted by a full node while performing a proof-of-work process, as described herein. A nonce can be input into a hash function along with block data to determine the output hash value. A correct nonce (also referred to as a golden nonce) yields an output hash value that satisfies a predetermined criteria, such as being less than a difficulty value.

The second block 840 can be similar to the first block 810. For example, the second block 840 can include a block header 850 and block entries 860. The block header 850 of the second block 840 can comprise a previous hash 852, a timestamp 854, a Merkle root 856, and a nonce 858. The block entries 860 can include settlement data and/or exchange data, and can be similar to the block entries 830.

Figure 9:
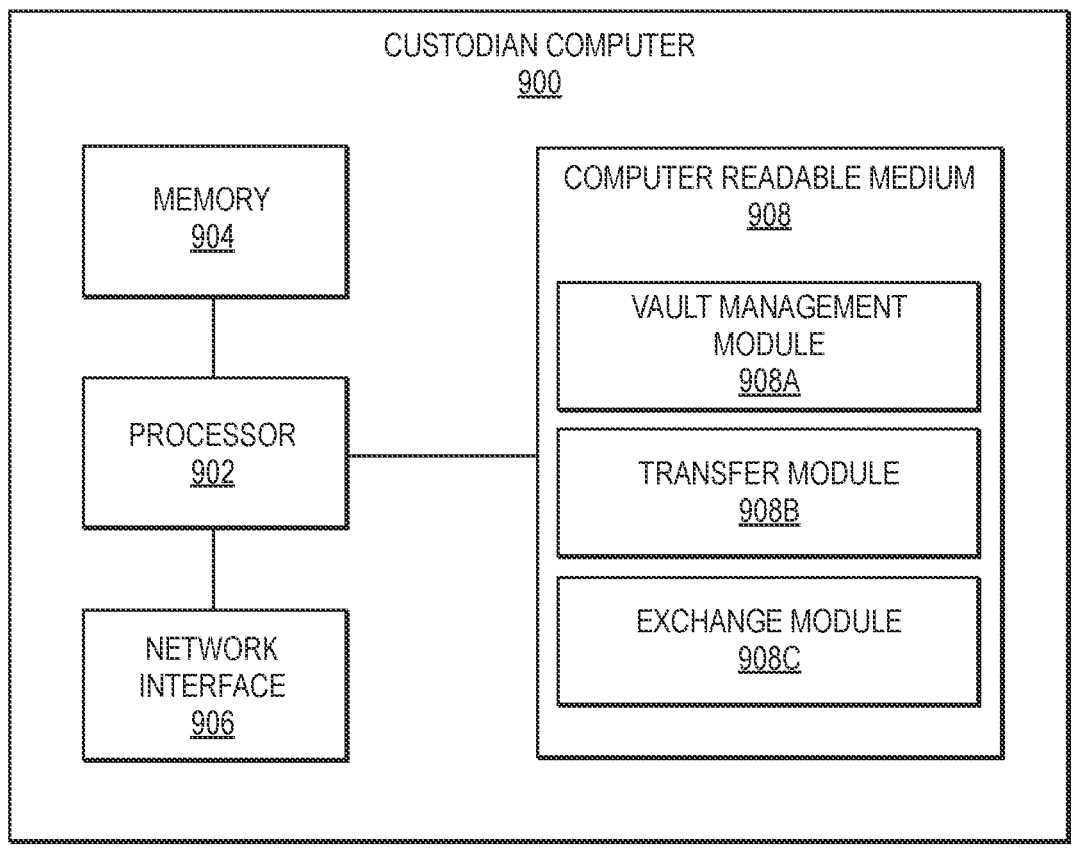
FIG. 9 shows a block diagram of a custodian computer.

FIG. 9 shows a block diagram of an exemplary custodian computer 900. The custodian computer 900 may be operated by a financial institution, such as a bank, a payment processing network, digital asset bank, etc. The custodian computer 900 may maintain digital vaults for external entities. For example, the custodian computer 900 may maintain a digital currency vault for a payment processing network. The custodian computer 900 may comprise a processor 902. The processor 902 may be coupled to a memory 904, a network interface 906, and a computer readable medium 908. The computer readable medium 908 may comprise any suitable number and types of software modules.

The memory 904 may be used to store data and code. The memory 604 may be coupled to the processor 902 internally or externally (e.g., via cloud based data storage), and may comprise any combination of volatile and/or non-volatile memory such as RAM, DRAM, ROM, flash, or any other suitable memory device. In some embodiments, the memory 904 may store the data items of a payload.

The network interface 906 may include an interface that can allow the custodian computer 900 to communicate with external computers and/or devices. The network interface 906 may enable the custodian computer 900 to communicate data to and from another device such as a processing network computer, a processing network account computer, a transport computer, an authorizing entity computer, etc. Some examples of the network interface 906 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 906 may include Wi-Fi™. Data transferred via the network interface 906 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 906 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 908 may comprise code, executable by the processor 902, for a method comprising: receiving, from a processing network computer, a transfer instruction file comprising a second settlement amount, a first destination associated with a digital vault at a custodian computer, and a second destination associated with a transport computer, wherein the processing network computer also transmits to an authorizing entity computer, a settlement file comprising a first settlement amount and the first destination; receiving, at the digital vault associated with the first destination from an authorizing entity computer, the first settlement amount, or an amount equivalent to the first settlement amount, the first settlement amount or the amount equivalent to the first settlement amount being equal to the second settlement amount; and transmitting a notification to the processing network computer that the first settlement amount or the amount equivalent to the first settlement amount was received by the custodian computer.

The computer readable medium 908 may comprise a number of software modules including, but not limited to, a vault management module 908A, a transfer module 908B, and an exchange module 908C.

The vault management module 908A may comprise code that causes the processor 902 to generate and maintain digital vaults. For example, the vault management module 908A may enable the custodian computer 900 to generate a digital currency vault for a processing network. The vault management module 908A may add, remove, or move digital assets stored in a digital vault. In some embodiments, the vault management module 908A enables the custodian computer 900 to generate digital vaults for a processing network unique to an external entity (e.g., an acquirer or issuer).

The transfer module 908B may comprise code that causes the processor 902 to receive and execute transfers. For example, a transfer instruction file may be received by the custodian computer 900. The transfer module 908B may communicate with the vault management module 908A to transfer digital assets to and from different digital vaults. The transfer module 908B may identify digital vaults maintained by the vault management module 908A via a digital address or vault ID. The transfer module 908B may enable the custodian computer 900 to communicate with blockchains to complete transfers of digital assets between digital vaults. The transfer module 908B may transfer fiat currencies to and from external computers.

The exchange module 908C may comprise code that causes the processor 902 to exchange between digital currency and fiat currency. For example, the exchange module 908C may comprise or be in communication with a custodian account computer. The exchange module 908C may receive instructions to convert between two types of currencies and execute the conversion. For example, the exchange module 908C may receive instructions to convert $1M USD to $1M USDC. The exchange module 908C may communicate with external computers to complete the conversion. The conversion may comprise sending an amount of digital assets from a digital vault to another, or sending fiat currency to and from accounts maintained at different computers.

Figure 10:
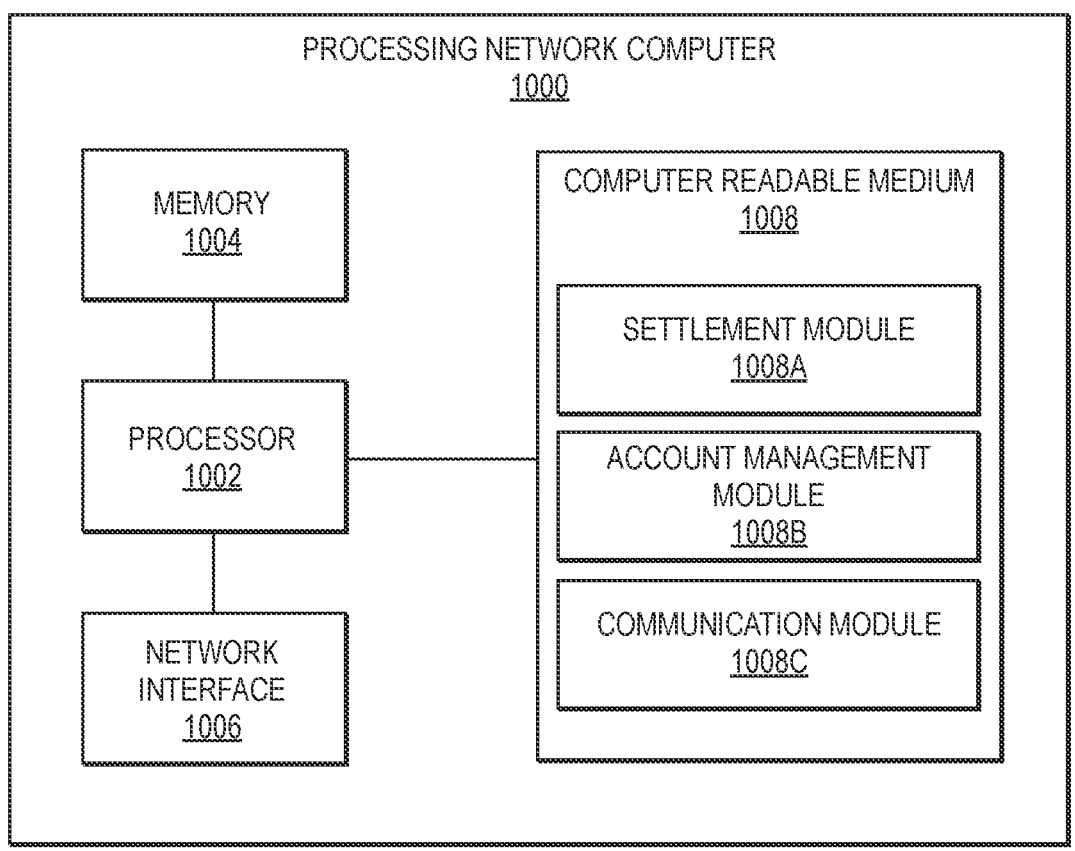
FIG. 10 shows a block diagram of a processing network computer.

FIG. 10 shows a block diagram of a processing network computer 1000. The processing network computer 100 may facilitate settlements between issuers and acquirers. The processing network computer 100 may comprise a processor 1002. The processor 1002 may be couple to a memory 1002, a network interface 1006, and a computer readable medium 1008. The computer readable medium 1008 may comprise any suitable number and types of software modules.

The memory 1002 and network interface 1006 may have the same features or different features as the previously described memory 902 and network interface 906.

The computer readable medium 1008 may comprise code, executable by the processor 1002, for a method comprising: receiving a plurality of clearing files from a plurality of transport computers; generating a settlement file comprising a first settlement amount and a first destination associated with a digital vault associated with the server computer at a custodian computer, based on data in the plurality of clearing files; transmitting to an authorizing entity computer, the settlement file comprising the first settlement amount and the first destination; and transmitting to the custodian computer, a transfer instruction file comprising the first destination, a second settlement amount and a second destination associated with one of the plurality of transport computers; and wherein the authorizing entity computer thereafter sends the first settlement amount or an amount equivalent to the first settlement amount to the first destination at the custodian computer and wherein the custodian computer or the server computer sends the second settlement amount to the second destination associated with the transport computer.

The computer readable medium 1008 may comprise a number of software modules including, but not limited to, a settlement module 1008A, an account management module 1008B, and a communication module 1008C.

The settlement module 1008A may comprise code that causes the processor 1002 to complete settlements. For example, the settlement module 1008A may receive a clearing file from an acquirer and generate a settlement file and a transfer instruction file. The settlement module 1008A may identify settlement amounts and destinations which are needed to complete a settlement.

The account management module 1008B may comprise code that cause the processor 1002 to maintain a processing network account. For example, the account management module 1008B may enable processor 1002 to communicate with a processing network account computer. In some embodiments, the account management module 1008B may allow the processing network computer 1000 to maintain a processing network account. The account management module 1008B may communicate with the settlement module 1008A to transfer digital and/or fiat currencies to and from accounts associated with the processing network computer 1000.

The communication module 1008C, in conjunction with the processor 1002, can generate messages, forward messages, reformat messages, and/or otherwise communicate with other entities. For example, communication module 1008C can be used to facilitate communications between the processing network computer 1000 and other computers.

Embodiments of the invention provide a number of advantages. Embodiments of the invention allow for transactions in generated by a user associated with an issuer operating an authorizing entity computer and a resource provider associated with an acquirer operating a transport computer to be cleared and settled in different currency types. As an illustration, the acquirer may indicate a currency type (e.g., a type of fiat currency or a type of digital currency) that they wish to receive a settlement payment in. A processing network computer and custodian computer may then allow the issuer may to provide payment in the same or different currency type via a number of digital vaults. The digital vaults can transmit and receive digital currencies to and from other digital vaults by writing transactions to blockchains. As noted above, embodiments of the invention can also use a plurality of digital vaults, with unique digital addresses on the blockchain, to anonymize settlement payments between issuers and acquirers. Further, since some settlement processes according to embodiments can use digital currencies, such settlement processes can be faster than pure conventional fiat settlement processes. Since embodiments can use blockchains to transfer value between vaults and external entities, the records associated with such transfers can be immutable unlike traditional methods for storing such value transfers.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by a processing network computer, a plurality of clearing files from a plurality of transport computers;
generating, by the processing network computer, a settlement file comprising a first settlement amount and a first destination associated with a digital currency vault on a blockchain associated with the processing network computer at a custodian computer, based on data in the plurality of clearing files, wherein the digital currency vault comprises a master vault associated with the processing network computer and storing a plurality of types of digital currency, a trading vault on the blockchain, and a receiving vault on the blockchain associated with one of the plurality of transport computers, and wherein the custodian computer transfers the first settlement amount from the master vault to the receiving vault, wherein the first settlement amount is anonymized on the blockchain;
transmitting, by the processing network computer to an authorizing entity computer, the settlement file comprising the first settlement amount and the first destination; and
transmitting, by the processing network computer to the custodian computer, a transfer instruction file comprising the first destination, a second settlement amount and a second destination associated with the one of the plurality of transport computers, wherein the second settlement amount is a fiat currency amount;
wherein the custodian computer converts an amount of digital currency in the master vault into fiat currency and deposits the fiat currency into an account maintained at the processing network computer; and
wherein the authorizing entity computer thereafter sends the first settlement amount or an amount equivalent to the first settlement amount to the first destination at the custodian computer and wherein the custodian computer or the processing network computer sends the second settlement amount to the second destination associated with the one of the plurality of transport computers using the converted fiat currency.

2. The method of claim 1, wherein the second destination is a bank account, and wherein the processing network computer sends the second settlement amount to the second destination associated with the transport computer.

3. The method of claim 1, wherein the processing network computer sends the second settlement amount to the second destination associated with the transport computer, and wherein the method further comprises:
transmitting, by the processing network computer to the custodian computer, a message comprising a first exchange amount, thereby causing the custodian computer to convert the amount of the digital currency in the master vault into the fiat currency.

4. The method of claim 1, wherein the custodian computer sends the second settlement amount to the second destination associated with the transport computer.

5. The method of claim 1, further comprising:
receiving, by the processing network computer from the custodian computer, confirmation of the transfer of the second settlement amount to the second destination.

6. The method of claim 1, wherein the first settlement amount is in digital currency.

7. The method of claim 1, wherein the custodian computer transfers the first settlement amount from the authorizing entity computer to the digital currency vault of the processing network computer at the custodian computer via the blockchain.

8. The method of claim 1, wherein the processing network computer further generates and maintains a processing network account that is used to pay the transport computer in fiat currency.

9. The method of claim 1, wherein the plurality of clearing files contain transaction data associated with transactions conducted between multiple users and resource providers using digital currencies.

10. The method of claim 9, wherein the digital currencies are cryptocurrencies.

11. A server computer comprising:
a processor; and
a non-transitory computer readable medium comprising code executable by the processor for executing:
receiving a plurality of clearing files from a plurality of transport computers;
generating a settlement file comprising a first settlement amount and a first destination associated with a digital currency vault on a blockchain associated with the server computer at a custodian computer, based on data in the plurality of clearing files, wherein the digital currency vault comprises a master vault on the blockchain associated with a processing network computer and storing a plurality of types of digital currency, a trading vault on the blockchain, and a receiving vault on the blockchain associated with one of the plurality of transport computers, and wherein the custodian computer transfers the first settlement amount from the master vault to the receiving vault, wherein the first settlement amount is anonymized on the blockchain;
transmitting to an authorizing entity computer, the settlement file comprising the first settlement amount and the first destination; and
transmitting to the custodian computer, a transfer instruction file comprising the first destination, a second settlement amount and a second destination associated with the one of the plurality of transport computers, wherein the second settlement amount is a fiat currency amount;
wherein the custodian computer converts an amount of digital currency in the master vault into fiat currency and deposits the fiat currency into an account maintained at the server computer; and
wherein the authorizing entity computer thereafter sends the first settlement amount or an amount equivalent to the first settlement amount to the first destination at the custodian computer and wherein the custodian computer or the server computer sends the second settlement amount to the second destination associated with the one of the plurality of transport computers using the converted fiat currency.

12. The server computer of claim 11, wherein the server computer is a processing network computer.

13. The server computer of claim 11, wherein the custodian computer sends the second settlement amount to the second destination associated with the transport computer.

14. The server computer of claim 11, wherein the second destination is a bank account, and wherein the server computer sends the second settlement amount to the second destination associated with the transport computer.

15. The server computer of claim 11, wherein the server computer sends the second settlement amount to the second destination associated with the transport computer, and wherein the server computer transmits, to the custodian computer, a message comprising a first exchange amount, thereby causing the custodian computer to convert the amount of the digital currency in the master vault into the fiat currency.

16. A method comprising:
receiving, by a custodian computer from a processing network computer, a transfer instruction file comprising a second settlement amount, a first destination associated with a digital currency vault on a blockchain at the custodian computer, and a second destination associated with a transport computer, wherein the processing network computer also transmits to an authorizing entity computer, a settlement file comprising a first settlement amount and the first destination, wherein the digital currency vault comprises a master vault on the blockchain associated with the processing network computer and storing a plurality of types of digital currency, a trading vault on the blockchain, and a receiving vault on the blockchain associated with the transport computer, wherein the first settlement amount is anonymized on the blockchain;
receiving, at the digital currency vault associated with the first destination at the custodian computer from the authorizing entity computer, the first settlement amount, or an amount equivalent to the first settlement amount, the first settlement amount or the amount equivalent to the first settlement amount being equal to the second settlement amount, wherein the second settlement amount is a fiat currency amount;
transferring, by the custodian computer, the first settlement amount from the master vault to the receiving vault;
converting, by the custodian computer, an amount of digital currency in the master vault into fiat currency:
depositing, by the custodian computer, the fiat currency into an account maintained at the processing network computer; and
transmitting, by the custodian computer, a notification to the processing network computer that the first settlement amount or the amount equivalent to the first settlement amount was received by the custodian computer.

17. The method of claim 16, wherein the first settlement amount is a digital currency amount.

18. The method of claim 16, wherein the transport computer is operated by an acquirer and the authorizing entity computer is operated by an issuer.

19. The method of claim 16, wherein the custodian computer receives the first settlement amount by transferring the first settlement amount from the authorizing entity computer to the digital currency vault of the processing network computer at the custodian computer via the blockchain.

20. The method of claim 17, wherein the processing network computer is configured to process credit and debit card transactions.

\* \* \* \* \*